(12) United States Patent
Rajagopal et al.

(10) Patent No.: US 9,924,204 B2
(45) Date of Patent: Mar. 20, 2018

(54) SYSTEMS AND METHODS FOR PERSONALIZED IN-FLIGHT ENTERTAINMENT

(71) Applicants: Harish Nair Rajagopal, Trivandrum (IN); Tinku Malayil Jose, Bangalore (IN)

(72) Inventors: Harish Nair Rajagopal, Trivandrum (IN); Tinku Malayil Jose, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/746,143

(22) Filed: Jun. 22, 2015

(65) Prior Publication Data
US 2016/0286258 A1    Sep. 29, 2016

(30) Foreign Application Priority Data
Mar. 28, 2015  (IN) ........................... 1600/CHE/2015

(51) Int. Cl.
*H04N 21/214*    (2011.01)
*H04N 21/218*    (2011.01)
*H04N 21/262*    (2011.01)

(52) U.S. Cl.
CPC ..... *H04N 21/2146* (2013.01); *H04N 21/2181* (2013.01); *H04N 21/21815* (2013.01); *H04N 21/262* (2013.01)

(58) Field of Classification Search
CPC ......... H04N 21/2146; H04N 21/25891; H04N 21/4325; H04N 21/472; B64D 11/0015; G06F 3/0482; G06F 3/04842; G06F 3/0488
See application file for complete search history.

(56) References Cited

U.S. PATENT DOCUMENTS

| | | | |
|---|---|---|---|
| 9,043,846 B2* | 5/2015 | Cline | H04N 21/2146 725/76 |
| 2008/0141315 A1* | 6/2008 | Ogilvie | H04N 7/15 725/77 |
| 2013/0063612 A1* | 3/2013 | Royster | H04N 21/2146 348/207.99 |

(Continued)

*Primary Examiner* — Hai V Tran
(74) *Attorney, Agent, or Firm* — Finnegan, Henderson, Farabow, Garrett & Dunner LLP

(57) ABSTRACT

This disclosure relates to systems and methods for personalized in-flight entertainment. In one embodiment, an in-flight content personalization method is disclosed. Flight information associated with an aircraft may be received at an airline server. One or more passengers related to the flight information may be identified, and content for synchronization to an in-flight entertainment server located on the aircraft for the one or more passengers may be determined. After determining that the airline server is operatively connectable to the in-flight entertainment server, the content may be synchronized. In another embodiment, an in-flight entertainment personalization method is disclosed. Content may be received at an in-flight entertainment server from an off-aircraft airline server via a network connection. A user request for personalized content may be received from a device located on an aircraft during flight. The personalized content for responding to the user request may be identified and provided.

12 Claims, 7 Drawing Sheets

(56) References Cited

U.S. PATENT DOCUMENTS

2014/0324710 A1* 10/2014 Thibout ............... G06Q 50/184
 705/310
2015/0081837 A1* 3/2015 Bernier ................. H04W 8/24
 709/217

* cited by examiner

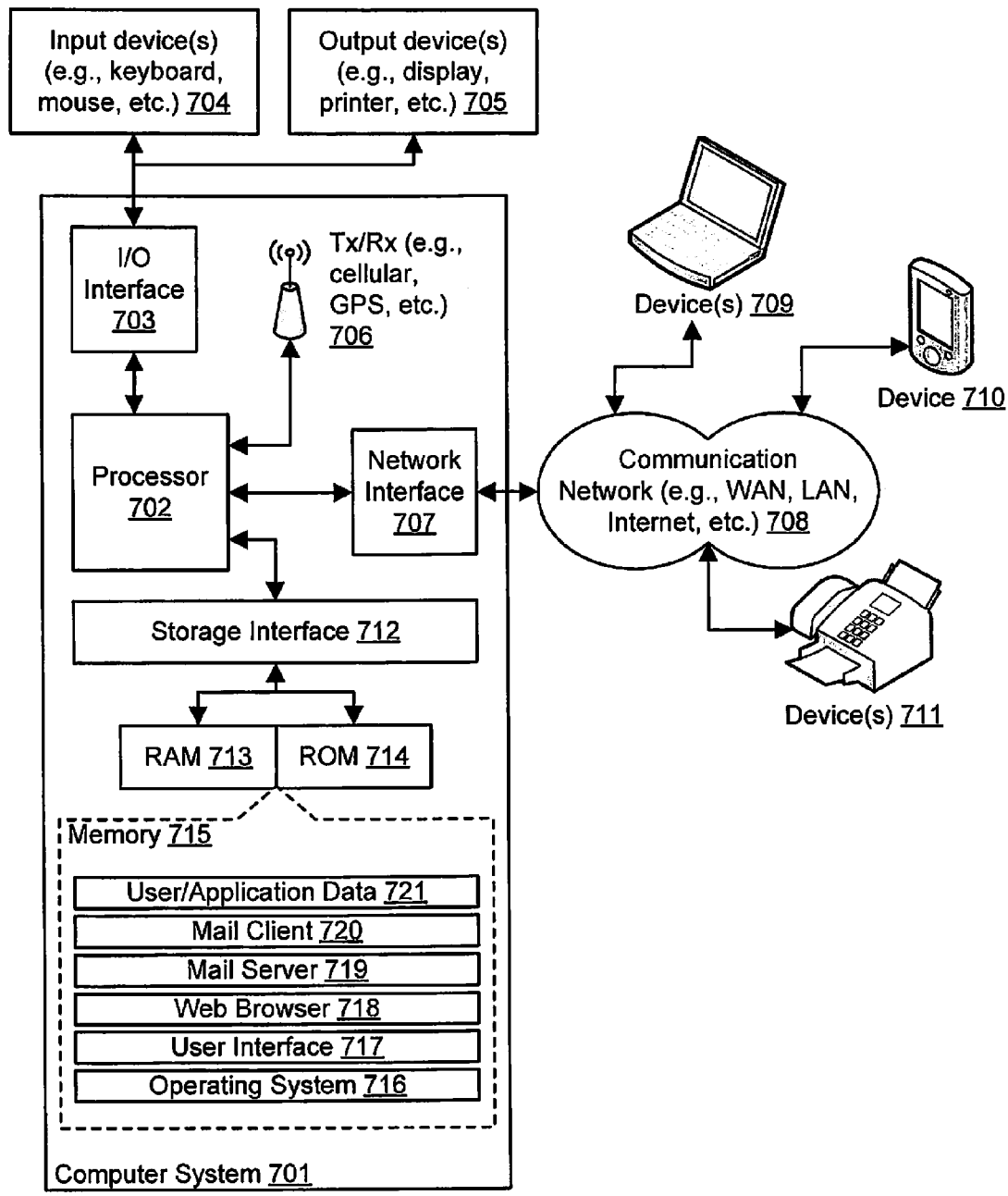
FIG. 7: Example Computer System

SYSTEMS AND METHODS FOR PERSONALIZED IN-FLIGHT ENTERTAINMENT

PRIORITY CLAIM

This U.S. patent application claims priority under 35 U.S.C. § 119 to Indian Application No. 1600/CHE/2015, filed on Mar. 28, 2015. The aforementioned application is incorporated herein by reference in its entirety.

TECHNICAL FIELD

This disclosure relates generally to personalized entertainment content, and more particularly to systems and methods for personalized in-flight entertainment.

BACKGROUND

Modern day airplanes are equipped with interactive in-flight entertainment (IFE) systems and displays that provide passengers with a collection of movies, TV shows, music, games, and other content during flight. Federal Aviation Administration and other aviation authorities have recently modified their rules to allow users to use personal devices like mobiles, tablets, etc. in airline mode. Typically, airline applications may be installed on personal devices. In addition, some airlines offer in-flight connectivity after take-off, during the flight. The content available may be hosted by servers onboard the flight, and can be streamed on demand by the servers to display units installed in the aircraft.

When in-flight announcements occur, streaming typically pauses immediately. Onboard systems stream available announcement audio to headphones connected to the display units, and a notification may be shown on the display unit. Centralized control is available on the airplane for the crew to switch all display units to specific audio-video content (for example, pre-flight safety videos, airport information, airline promotions, etc.).

SUMMARY

Embodiments of the present disclosure may solve one or more of these example problems recognized by the inventors, as well as other problems with current IFE systems. For example, in one embodiment, a processor-implemented in-flight content personalization method is disclosed. The method may include receiving at an airline server, including one or more hardware processors, flight information associated with an aircraft, and identifying, via the one or more hardware processors, one or more passengers related to the flight information. The method may include determining, via the one or more hardware processors, content, for the one or more passengers, to be synchronized to an in-flight entertainment server located on the aircraft. After determining, via the one or more hardware processors, that the airline server is operatively connectable to the in-flight entertainment server, the method may include synchronizing, via the one or more hardware processors, the content to the in-flight entertainment server.

In another embodiment, an in-flight content personalization system is disclosed. The system may comprise one or more hardware processors, and one or more memory devices storing instructions executable by the one or more hardware processors to perform a method. The method may include receiving at an airline server, including one or more hardware processors, flight information associated with an aircraft, and identifying, via the one or more hardware processors, one or more passengers related to the flight information. The method may include determining, via the one or more hardware processors, content, for the one or more passengers, to be synchronized to an in-flight entertainment server located on the aircraft. After determining, via the one or more hardware processors, that the airline server is operatively connectable to the in-flight entertainment server, the method may include synchronizing, via the one or more hardware processors, the content to the in-flight entertainment server.

In yet another embodiment, a non-transitory computer-readable medium is disclosed, storing instructions executable by one or more hardware processors to perform an in-flight content personalization method. The method may include receiving at an airline server, including one or more hardware processors, flight information associated with an aircraft, and identifying, via the one or more hardware processors, one or more passengers related to the flight information. The method may include determining, via the one or more hardware processors, content, for the one or more passengers, to be synchronized to an in-flight entertainment server located on the aircraft. After determining, via the one or more hardware processors, that the airline server is operatively connectable to the in-flight entertainment server, the method may include synchronizing, via the one or more hardware processors, the content to the in-flight entertainment server.

In yet another embodiment, a processor-implemented in-flight entertainment personalization method is disclosed. The method may comprise receiving, at an in-flight entertainment server including one or more hardware processors, content from an off-aircraft airline server via a network connection. Also, the method may include receiving, via the one or more hardware processors, a user request for personalized content from a device located on an aircraft during flight. Further, the method may comprise identifying the personalized content for responding to the user request, and providing the personalized content for responding to the user request.

In yet another embodiment, an in-flight entertainment personalization system is disclosed. The system may comprise one or more hardware processors, and one or more memory devices storing instructions executable by the one or more hardware processors to perform a method. The method may comprise receiving, at an in-flight entertainment server including one or more hardware processors, content from an off-aircraft airline server via a network connection. Also, the method may include receiving, via the one or more hardware processors, a user request for personalized content from a device located on an aircraft during flight. Further, the method may comprise identifying the personalized content for responding to the user request, and providing the personalized content for responding to the user request.

In yet another embodiment, a non-transitory computer-readable medium is disclosed, storing instructions executable by one or more hardware processors to perform an in-flight entertainment personalization method. The method may comprise receiving, at an in-flight entertainment server including one or more hardware processors, content from an off-aircraft airline server via a network connection. Also, the method may include receiving, via the one or more hardware processors, a user request for personalized content from a device located on an aircraft during flight. Further, the method may comprise identifying the personalized content for responding to the user request, and providing the personalized content for responding to the user request.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 is a block diagram of an exemplary computer system for implementing embodiments consistent with the present disclosure.

DETAILED DESCRIPTION

Figure 1:
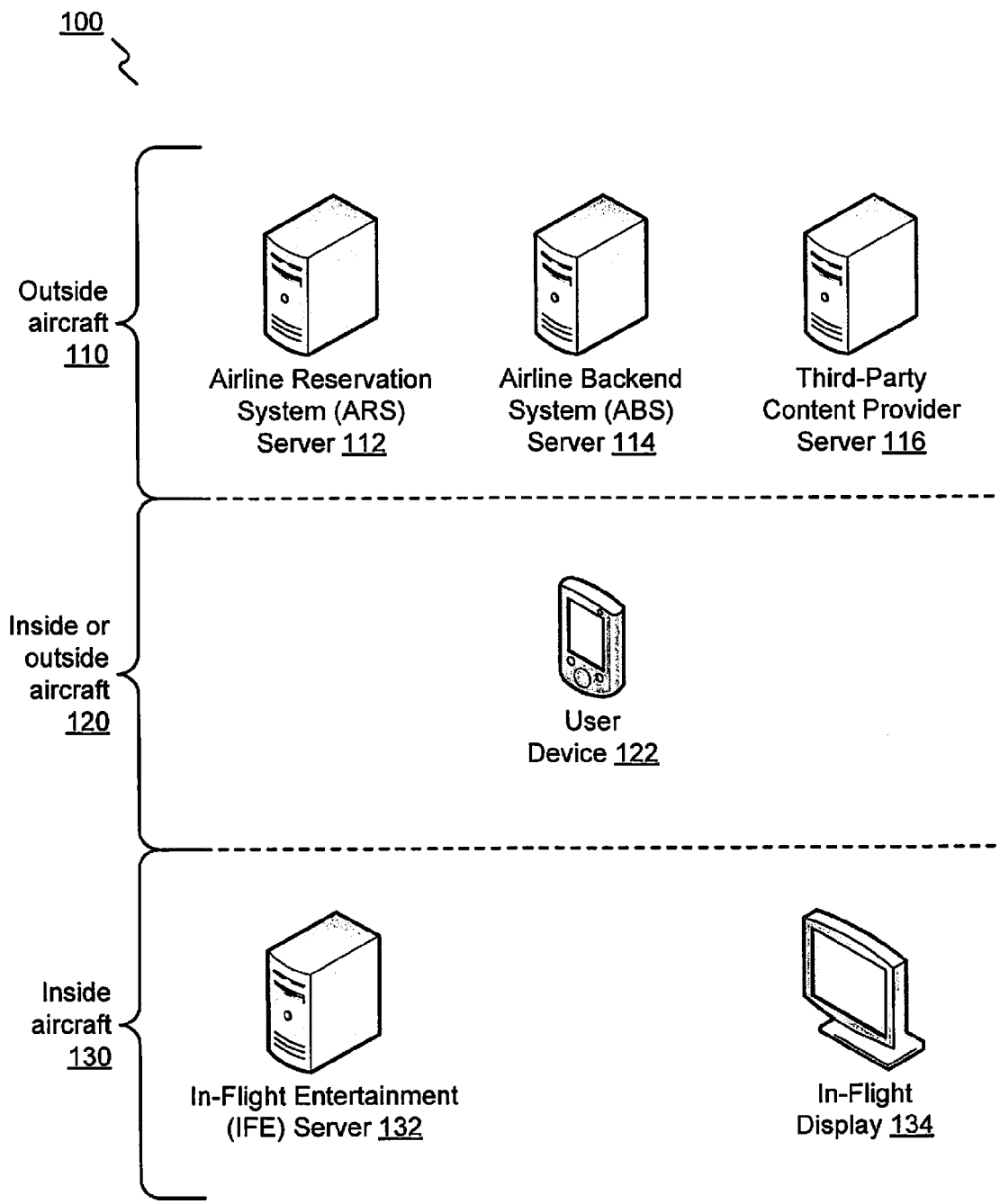
FIG. 1 illustrates an exemplary IFE system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure recognizes example problems with existing IFE systems. In existing systems, the content catalogue for the content available during a flight is occasionally available for the user via airline portals or applications. But users may not have access to the content on the flight, since loading and un-loading of the content into IFE systems is not centralized and can depend on the engineering team associated with the flight. Moreover, during multi-hop flights, both legs of the flight may not have the same content available that the user is interested in watching.

Currently, while the passenger may view content for the entire duration of flight using screens placed in airplanes (e.g., on seatbacks), the content available or advertisements pushed to the passenger may not be relevant to the passenger. Also, passenger engagement with the entertainment available, especially during long haul flights, affects the travel experience. Hence, improved entertainment options may result in increased business.

The user may also be unable to plan any viewing before flight based on content catalog availability. For example, no mechanism currently exists for creating playlist of contents before flight. Further, current systems do not ensure the availability of content across multiple hops of travel. Users may have to manually note interesting content, and then hope to see the content on subsequent flights.

When families are travelling together, there is currently no way for parents to control the viewable content on a display other than physically controlling the interactive application. Also, children or even adult co-passengers may not be able to interact with the application due to a lack of understanding of the controls on the display units installed in the aircraft. For example, elderly passengers may have trouble interacting with touchscreen systems due to difficulties with vision, tactile interfaces, or technology systems in general.

Moreover, during multi-hop flights, users may be in the middle of a movie at the time of landing. These passengers may desire to continue watching the same movie on the next leg of flight. But currently, there is no guarantee that the user can view the content on the next flight. Even if it is there, user may have to search for the content and the time from which they want to pick up the viewing again.

Improved systems and methods for personalized IFE may store personalized data, user preferences, playlists, bookmarks (dynamic and static), favorites, and content, for example. This information may be provided to the display device, which can be used by the passenger before, during and after flights, even across multiple hops. Further, IFE systems and methods may synchronize loading of content on all flights, resulting in consistent flight IFE content, for example, based on customer demand. Further, improved systems and methods may allow passengers to seamlessly control viewable content for other users travelling with them (e.g., children, elderly).

Disclosed embodiments may also include an on-board system for use on airplanes, trains, ships and other vessels, and which enables entertainment and communications features customizable by each passenger.

Illustrative embodiments of the present disclosure are listed below. In one embodiment, processor-implemented in-flight content personalization methods are disclosed. Computer-readable media are disclosed for implementing the methods. In another embodiment, in-flight content personalization systems are disclosed.

FIG. 1 illustrates an exemplary IFE system according to some embodiments of the present disclosure. Personalized IFE system 100 is depicted.

The components of the IFE system 100 may be organized based on location. In an embodiment, airline reservation system (ARS) server 112 may be partitioned into three location classifications. System 100 may be organized into outside aircraft class 110, inside or outside aircraft class 120, and inside aircraft class 130. For example, outside aircraft class 110 may include devices that are physically located outside of an airplane. Inside or outside aircraft class 120 may include devices that may operate in an airplane or outside of an airplane. For example, inside or outside aircraft class 120 may require that device be capable of operating both during flight and outside of an airplane on ground (e.g., at an airport). Inside aircraft class 130 may include devices that are physically located in an aircraft.

Outside aircraft class 110 may include airline reservation system (ARS) server 112, airline backend system (ABS) server 114, and third-party content provider server 116. These servers may be located outside the aircraft. For example, networked components may be located anywhere geographically so long as they have network connectivity (e.g., an Internet connection).

Inside or outside aircraft class 120 may include user device 122. User device 122 may accompany a passenger during a flight and travel with a passenger after they reach a destination. Hence, user device 122 may operate in an aircraft (e.g., during a flight) and on land, outside of an aircraft (e.g., at an airport, during ground transport, etc.).

Example devices that may serve as user device 122 may include personal portable electronics. For example, user device 122 may be a laptop, tablet computer, smartphone, wrist-worn computer, or other portable computing device. Other devices may act as user device 122 such that they can perform the corresponding functions described in this disclosure.

Inside aircraft class 130 may include IFE server (IFES) 132 and in-flight display device (IFDD) 134. These components may be physically located in an airplane and operable during a flight. For example, IFES 132 and IFDD 134 may be installed in an aircraft, powered during operation of the vehicle. These components may be installed by the airplane manufacturer or installed as after-market modifications.

Figure 2:
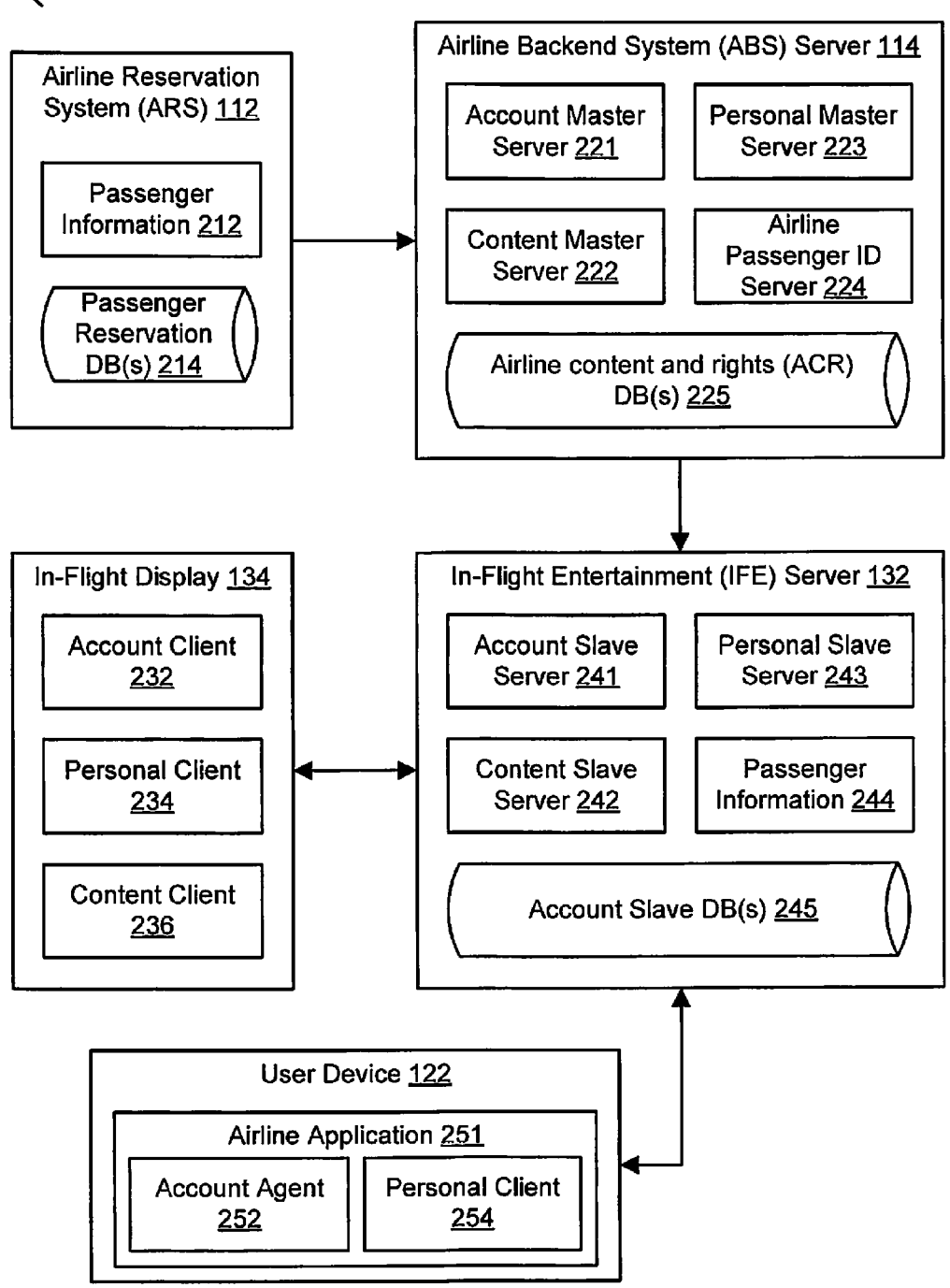
FIG. 2 is a functional block diagram according to some embodiments of the present disclosure.

FIG. 2 is a functional block diagram according to some embodiments of the present disclosure. Personalized IFE system 100 is depicted using functional blocks illustrating additional detail. The functional blocks may include hardware and/or software. For example, the functional blocks may be application-specific integrated circuits (ASICs), software applications, or programmed hardware processors.

ABS server 114 may include servers to manage airlines specific information and servers. Account Master Server (AMS) 221 may provide account management functions. For example, AMS 221 may hosts account details on ABS server 114. ABS server 114 may include Personal Master Server (PMS) 223. PMS 223 may manage personal data. For example, PMS 223 may hosts personal user data on ABS server 114.

Airline passenger identification server (APIS) 224 may manage airline passenger identification functions in ABS server 114. For example, APIS 224 may provide information related to the Airline Passenger ID and associated flights, such as seating and airline related information. ABS server 114 may include Content Master Server (CMS) 222 to manage available content for flights. For example, CMS 222 may store content for an airline to be loaded into IFE system 100 on all flights. CMS 222 may aggregate content from content in ABS server 114 and content that is served from third party content providers with associated usage policies and rights management.

In an embodiment, ABS server 114 may include a database to store and organize content and rights. ABS server 114 may include airline content and rights (ACR) database 225 to store content (e.g., movies, television shows, short films, games) and rights. The rights may define how the content may be used. For example, a particular film may be played on flights originating and/or terminating in a specific geopolitical area (e.g., a country or continent). The content rights may be further restricted such that the content may be viewed during flights in a specific country.

ARS 112 of IFE system 100 hosts travel reservation details. For example, ARS 112 may manage itineraries, seating data, flight details, and airline-provided passenger identifiers (e.g., frequent flyer numbers). ARS 112 may include passenger information server (PIS) 212 to manage passenger data. For example, PIS 212 may provide details regarding travel reservations, co-passengers in reservation, itinerary, and flight information. ARS 112 may include a database to store and organize data. In an embodiment, passenger reservation database 214 may store and organize flight reservation information.

IFE system 100 may also include in-flight entertainment server (IFES) 132. IFES 132 may host services and information needed for in-flight delivery. IFES 132 may have intermittent connectivity to the ABS server 114 to retrieve necessary content.

In an embodiment, IFES 132 may include accounts slave server (ASS) 241 to provide local storage of account details. For example, ASS 241 may cache details related to account on the IFES for use during a flight. ASS may act as a proxy for the AMS 221. Personal slave server (PSS) 243 may be part IFES 132. PSS 243 may cache details related to personal user data on IFES 132. PSS 243 may act as a proxy for the PMS 223. For example, when PMS 223 is unavailable (e.g., aircraft network disconnect), PSS 243 may provide necessary functions of PMS 223.

IFE server may also include passenger information agent (PIA) server 244 for providing passenger flight details. For example, PIA server 244 may provide details regarding travel reservations, co-passengers in reservation, seating, itinerary, flight information. Content slave server (CSS) 242 may also function in IFES 132. CSS 242 may manage content that is available for a specific flight.

IFES 132 may include a dedicated database to store and organize necessary information for IFES 132 to function. In an embodiment, account slave database 245 may store IFES 132 data. For example, account slave database 245 may archive and recall necessary passenger information or act as a local cache for slaver server data.

IFE system 100 may include IFDD 134. IFDD 134 may be installed in an aircraft for content consumption. For example, IFDD 134 may be installed at passenger seats to access content. IFDD 134 may include account client (AC) 232 to access account level details for a specific account. For example, AC 232 may provide account permissions. IFDD 134 may include personal client (PC) 234 to access personal user data for a specific account. For example, PC 234 may manage, store, and provide user account preferences. IFDD 134 may include content client (CC) 236 to access content for a particular account. For example, CC 236 may manage content access at the user level.

IFE system 100 may include user device 122. In an embodiment, user device 122 may operate airline application 251. Airline application 251 may include different agents to provide access to IFE system 100 functions. Airline application 251 may include account agent (AA) 252 to cache limited information related to a user account. For example, user may link an account to an airline passenger ID to operate airline application 251. AA 252 may act as a proxy for AMS 221 or ASS 241 for user device 122.

Airline application 251 may also include clients to access account-specific data. For example, personal client (PC) 254 may provide access to personal user data for a specific account. Further, Airline application 251 may include an account client (AC) and a content client (CC) (not depicted). AC may be used to access account level details for a specific account. CC may be used to access content for a particular account.

Figure 3:
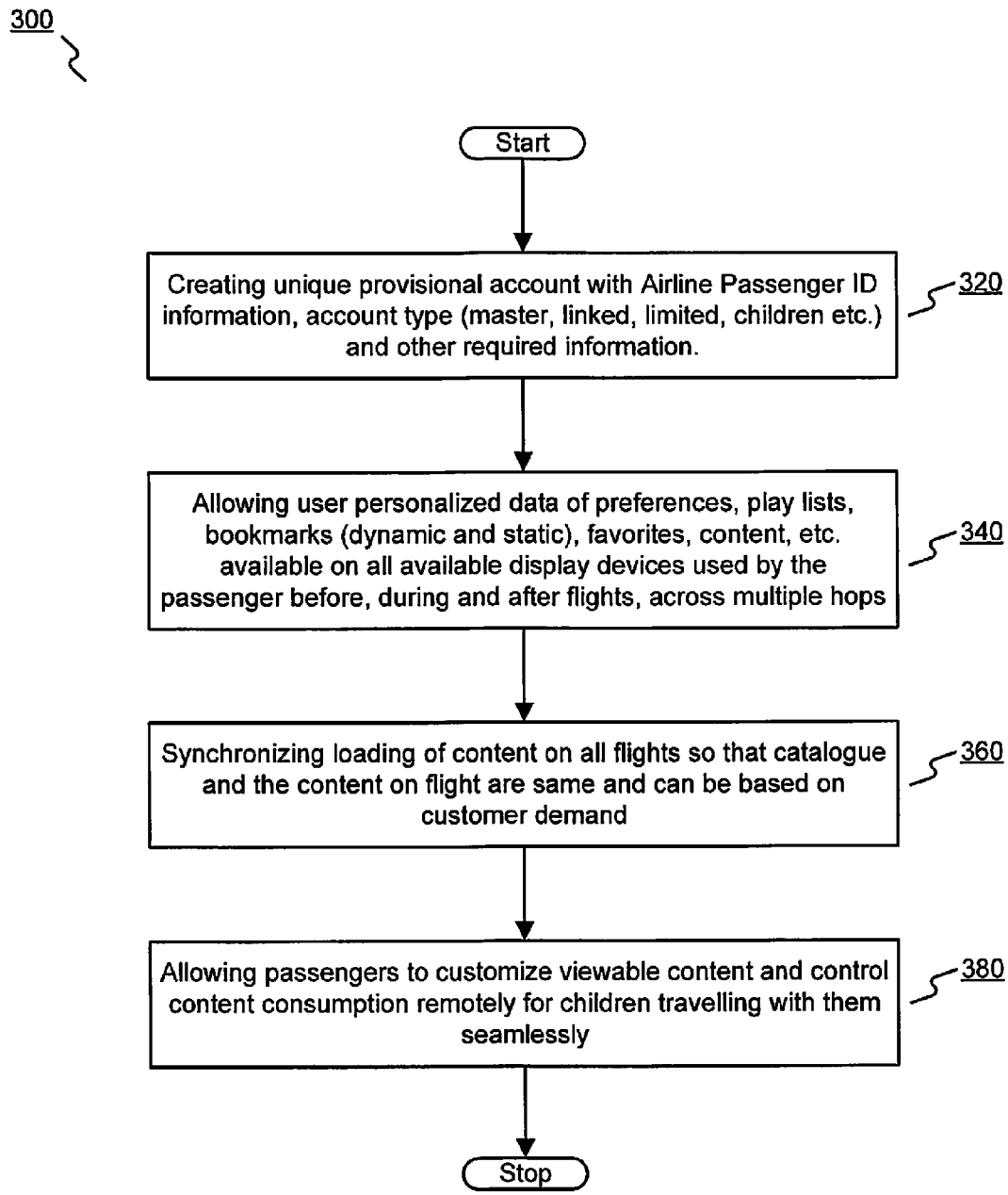
FIG. 3 is a flow diagram illustrating an example IFE process in accordance with some embodiments of the present disclosure.

FIG. 3 is a flow diagram illustrating an example IFE process in accordance with some embodiments of the present disclosure. Process 300 may describes functions performed by IFE system 100. Process 300 may be performed without the specific hardware arrangement of IFE system 100. Alternative arrangements may be used to perform process 300 consistent with the disclosed embodiments.

Process 300 may begin with step 320. In step 320, onboard passenger accounts may be created for personalized flight entertainment during pre-flight, in-flight and post-flight. Step 320 may be described in further detail in FIG. 4.

Figure 4:
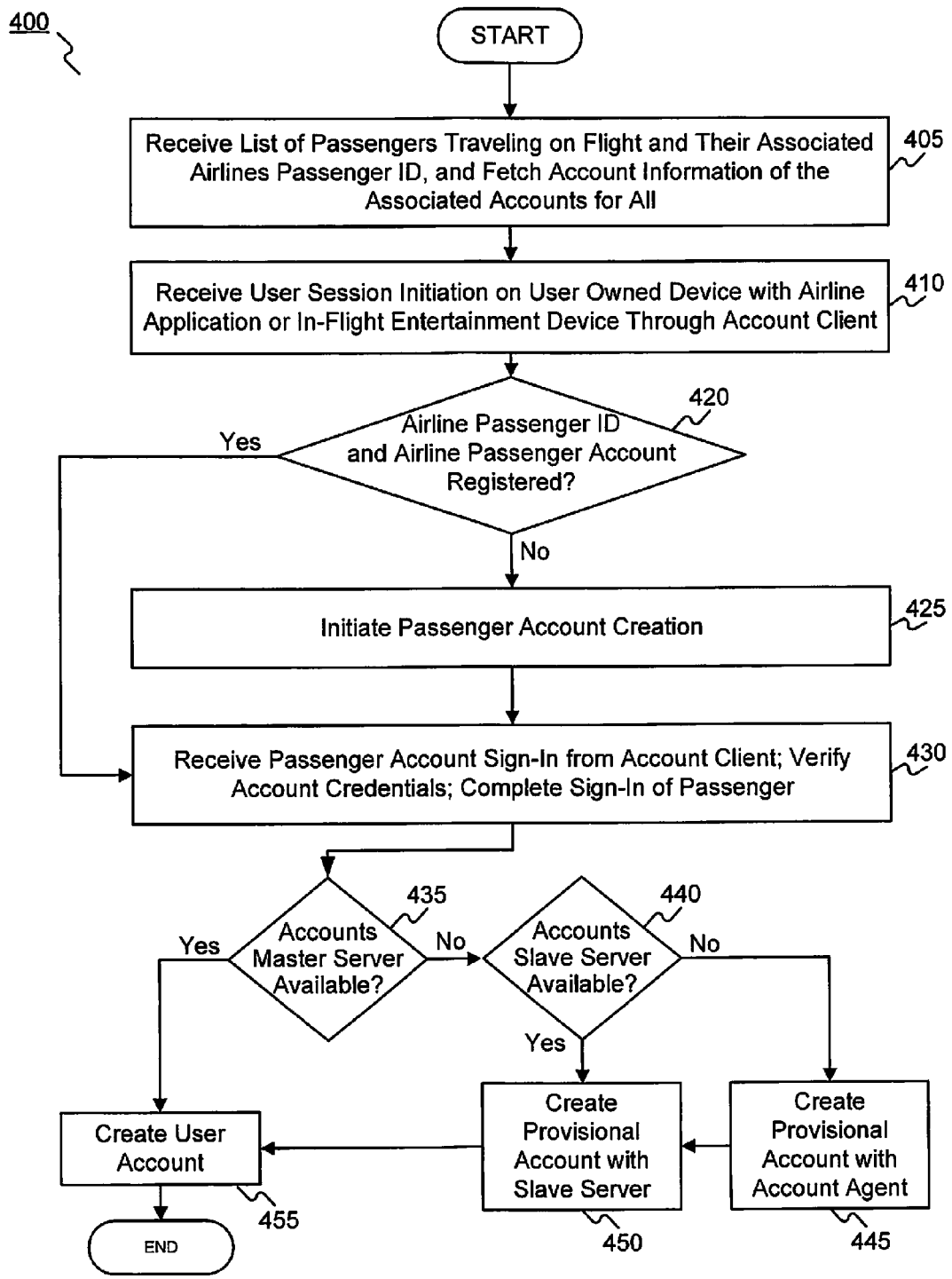
FIG. 4 is a flow diagram illustrating an example IFE process in accordance with some embodiments of the present disclosure.

FIG. 4 is a flow diagram illustrating an example IFE process in accordance with some embodiments of the present disclosure. Process 400 may begin with PIA server 244 receiving a list of passengers travelling on a particular flight and their associated airline passenger ID (e.g., a frequent flyer number) from the PIS 212 (step 405). In step 405, ASS 241 may use the list of airline passenger identifiers from the PIA server 244 to fetch account information of the associated accounts for all travelers.

In step 410, an account client (e.g., AC 232) may receive a passenger account sign-in initiation. AC 232 may pass account credentials to an account server. For example, AC 232 may pass credentials to AMS 221, ASS 241, and/or AA 252 depending upon availability and system preferences.

AMS 221 or ASS 241 may verify account credentials and permit the passenger to sign in. AA 252 may contain account credentials of the passenger using the device and may verify and allow log-in (step 430). In case account does not exist (step 420, no), AC 232 may initiate account creation using passenger details (step 425). For example, system 100 may register a user using airline passenger ID information, an account type (e.g., master, linked, limited, child), and other necessary information. AC 232 may pass information to an account server to create a provisional account.

In an embodiment, IFE system 100 may determine whether AMS 221 is available to process passenger sign-in (step 435). When AMS 221 is available (step 435, yes), ABS creates the user account (step 455). For example, ABS server 114 may be responsible for the comprehensive store of user accounts. However, when in flight, a connection to ABS server 114 may not be available. When AMS 221 is not available (step 435, no), IFE system 100 may determine whether ASS 241 is available (step 440). When ASS 241 is available (step 440, yes), the slave server may create a provisional account. For example, in step 450, IFES 132 may create a provisional account for use during the flight even though the official airline account database on ABS server 114 may not be reached. In an embodiment, ASS 241 may not be available (step 440, no). For example, ASS 241 may be interrupted due to electronics malfunctions or overwhelmed with other pending requests. In these instances, AA 252 may create a provisional account on user device 122. A local provisional account may allow user device 122 to access necessary functions even though an account cannot be created in airline databases. AA 252 and ASS 241 may pass information on provisional accounts to the AMS 221 when connectivity is available. For example, when a land-based or satellite internet connection is available in-flight, AA 252 may upload provisional account details with AMS 221 to make an airline record of the account. In other instances, AA 252 and ASS 241 may synchronize provisional accounts when the flight has landed.

Returning to FIG. 3, in step 340, personalized data is aggregated to provide content. Step 340 may be described in further detail in FIG. 5.

Figure 5:
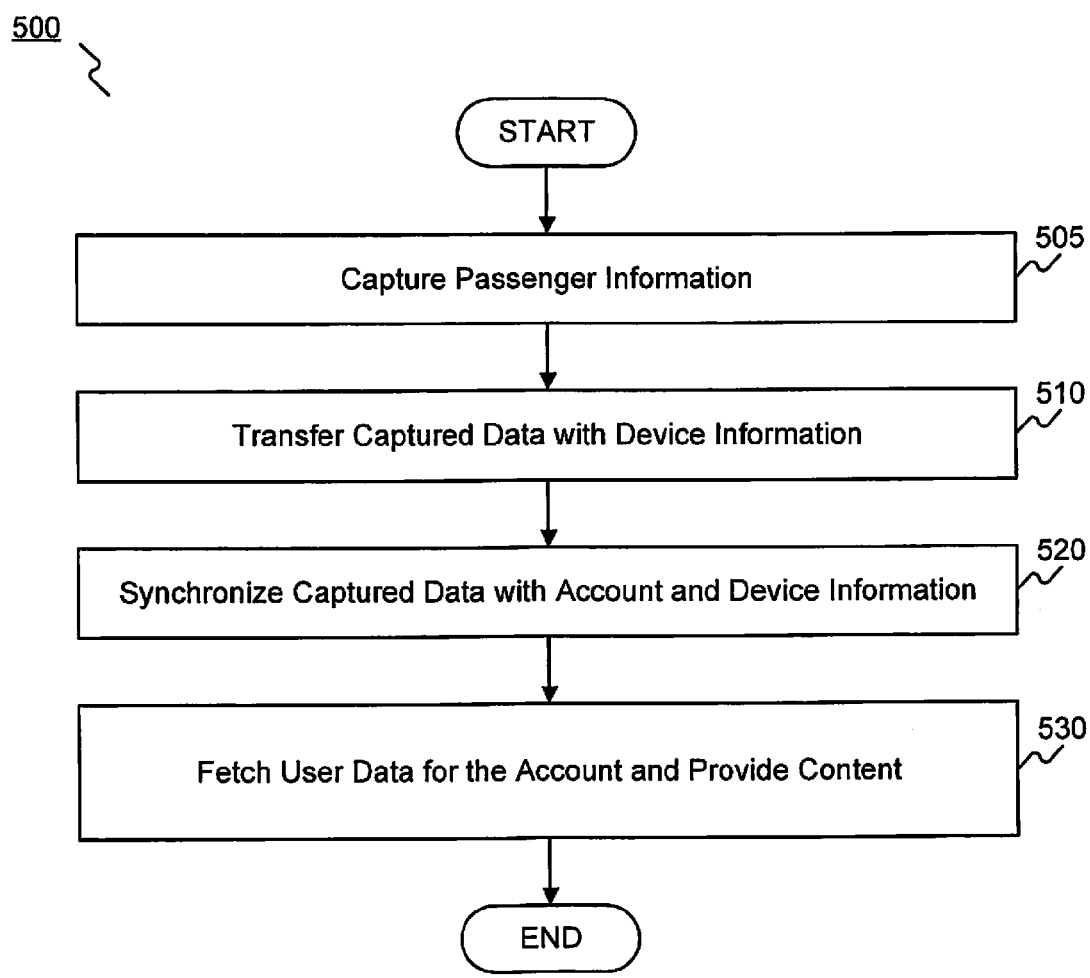
FIG. 5 is a flow diagram illustrating another example IFE process in accordance with some embodiments of the present disclosure.

FIG. 5 is a flow diagram illustrating another example IFE process in accordance with some embodiments of the present disclosure.

Process 500 may permit user personalized data to be available throughout a flight experience. For example, user preferences, playlists, bookmarks (dynamic and static), favorites, and content may be available on display device (e.g., IFDD 134 and/or user device 122) during and after flights, even across multiple hops.

In step 505 PC 254 may capture the information pre-flight, post-flight or during flight. For example, when used by the passenger on user device 122 via the airline application 251 or IFDD 134 using CC 236 and AC 232.

For example, PC 254 may capture data indicating the device in which user is viewing content, preferences selected by the user, playlists created and modified by the user, bookmarks created by the users (static), bookmarks created by the content client during streaming (dynamic—for pausing during in-flight announcements, force switching, end of flight, etc.), favorite content, and watched content data (e.g., content name, type, and duration of viewing).

PC 234 may transfer captured data with account and device information to one of a personal server (e.g., PMS 223 and/or PSS 243) based on preferences and availability. When PMS 223 is not available, PSS 243 may synchronize the captured data along with account and device information to PMS 223 as needed whenever connectivity is available (step 510). A PC of user device 122 (e.g., via the airline application 251) or IFDD 134 may obtain personal data for the account from a personal server (e.g., PMS 223 and/or PSS 243) in order of preference based on availability for viewing or modifying.

Content Client requests content listing from one of the content master Server or Content slave Server in order of preference based on availability and also sends the account and device information (step 520). CMS 222 or CSS 242 may fetch user data for the account from PMS or PSS 243 based on availability. In step 530, content server may provide content to a content client (e.g., CC 236) based on user data and the device from which the request originated.

Returning to FIG. 3, in step 360, IFE system 100 may synchronize content across flights. Step 360 may be described in further detail in FIG. 6.

Figure 6:
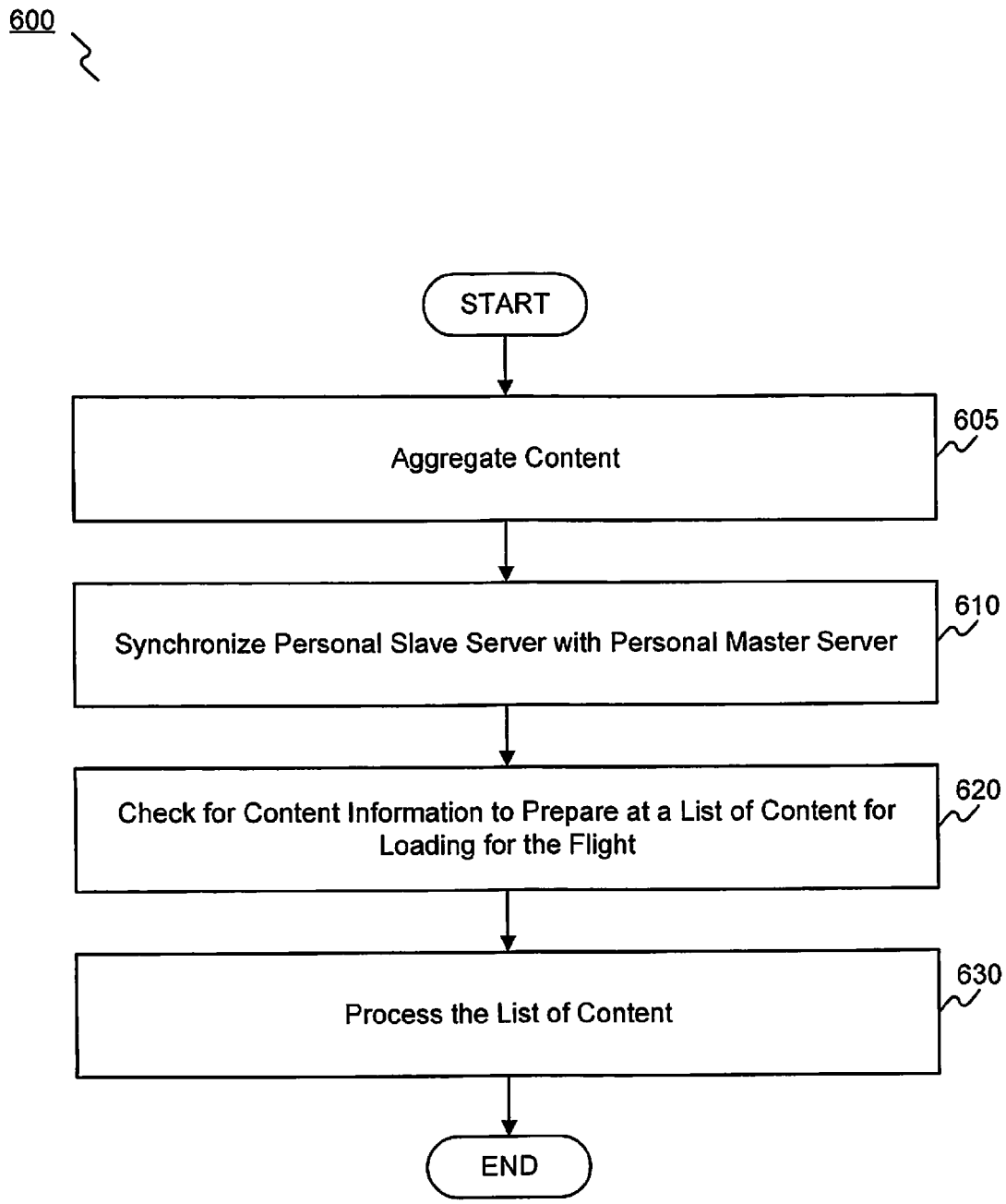
FIG. 6 is a flow diagram illustrating an additional example IFE process in accordance with some embodiments of the present disclosure.

FIG. 6 is a flow diagram illustrating an additional example IFE process in accordance with some embodiments of the present disclosure. In step 610, CSS 242 may synchronize PSS 243 with PMS 223. CSS 242 may also ask for a list of content that is available for the flight from CMS 222 (step 620). For example, CSS 242 may request an update content list at pre-defined times based on the phase of flight.

In step 630, CMS 222 may iterate through a checklist to determine a list of content for loading for the flight. For example, CMS 222 may identify a complete list based on the phase of flight communicated from CSS 242, content rights given by content provider, user playlists and preferences of passengers on-board (e.g., from PMS 223), dynamic and static bookmarks (e.g., from PMS 223), available storage space (e.g., on CSS 242), pre-existing content on IFES 132 (e.g., for CSS 242), usage of content on previous flights (e.g., in same flight path segment across time).

CMS 222 may send to the list of content to CSS 242. In step 630, CSS 242 may process the list of content that is received from CMS 222. For example, CMS 222 may delete content that is not needed and copy content that are needed into a slave database from a master database (e.g., ACR database 225).

Returning to FIG. 3, in step 380, IFE system 100 may facilitate passenger customization of content. In an embodiment, IFE system may provide a group control mechanism. For example, passengers may travel in a group. IFE system 100 may allow group devices to be controlled together. IFE system 100 may allow a single user to control devices or viewable content for other passengers (e.g., children, elderly, technologically challenged people, etc.).

In step 380, an account client (e.g., AC 232), which is signed in using master account, may query for accounts that it can control using AMS 221 and ASS 241. AMS 221 and ASS 241 may find the airline passenger ID associated with the account making the request. Other accounts with that airline passenger ID, that have subordinate account types, which allow the subordinate accounts to be controlled by the master account, are identified by an account server. The account server (AMS 221 and ASS 241) may generate a list of these accounts and transmit the list to the account client signed in using a master account. The master account client may query for lists of devices to which the controllable accounts are signed-in. The master account client may send the query to a personal server (e.g., PMS 223 or PSS 243, based on preference and availability). PMS 223 or PSS 243 may send the list of devices based on the query it receives to the master account client including with access methods to the content client on the devices being used with subordinate accounts. The subordinate control may utilize direct or indirect (via servers) messaging. The master account client may send commands to the content client on the subordinate devices. For example, the commands may control content viewing via the access methods provided for the device.

FIG. 7 is a block diagram of an exemplary computer system for implementing embodiments consistent with the present disclosure. Variations of computer system 701 may be used for implementing the devices, components, and systems disclosed herein. Computer system 701 may comprise a central processing unit ("CPU" or "processor") 702. Processor 702 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 710, 711, and 712. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases and memory systems disclosed herein.

The memory devices may store a collection of program or database components, including, without limitation, an operating system 716, user interface 717, web browser 718, mail server 719, mail client 720, user/application data 721 (e.g., passenger reservation database 214, ACR database 225, account slave database 245, PIA server 244, and PIS 212), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for personalized in-flight entertainment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented in-flight entertainment personalization method, comprising:
   transmitting, by an in-flight entertainment server including one or more hardware processors, a query of a list of subordinate devices that are being used with a subordinate account;
   receiving, at the in-flight entertainment server including the one or more hardware processors, a list of subordinate devices in response to the query;
   receiving, via the one or more hardware processors from a first device via a master account, a content access control instruction;
   receiving, via the one or more hardware processors from a second device, associated with a passenger, from the list of subordinate devices, a user request for personalized content comprising information associated with a partially viewed content on one or more prior flights from a device located on an aircraft during a current flight;
   identifying the personalized content comprising the information associated with the partially viewed content for responding to the user request;
   determining that access of the partially viewed content by the second device is subject to control by the content access control instruction; and
   responsive to determining that the personalized content is accessible by the second device based on the content access control instruction, providing the personalized content for responding to the user request, wherein providing comprises resuming in the current flight the partially viewed content for user consumption from a point of termination in the one or more prior flights.

2. The method of claim 1, further comprising:
- aggregating, via the one or more hardware processors, information on user preferences for the personalized content from at least one of: a mobile device; a display device located in the aircraft; or an airline passenger account; and
- providing, via the one or more hardware processors, the aggregated user preferences to the off-aircraft airline server via the network connection.

3. The method of claim 1, wherein the personalized content for responding to the user request is identified using at least one of: a phase of a journey of the aircraft, one or more user content playlists, or one or more user content preferences.

4. The method of claim 1, wherein the personalized content is identified using information on a geographic extent of content rights associated with the personalized content.

5. The method of claim 1,
- wherein the in-flight entertainment server is operatively connectable to a display device affixed in the aircraft during flight; and
- wherein the personalized content is provided to the display device for responding to the user request from the device located on the aircraft during flight.

6. The method of claim 1, wherein the device located on the aircraft during flight is one of: a passenger mobile device or a display device affixed in the aircraft during flight.

7. An in-flight entertainment personalization system, comprising:
- one or more hardware processors; and
- one or more memory devices storing instructions executable by the one or more hardware processors for:
  - transmitting, by an in-flight entertainment server including the one or more hardware processors, a query of a list of subordinate devices that are being used with a subordinate account;
  - receiving, at the in-flight entertainment server including the one or more hardware processors, a list of subordinate devices in response to the query;
  - receiving, via the one or more hardware processors from a first device via a master account, a content access control instruction;
  - receiving, via the one or more hardware processors from a second device, associated with a passenger, from the list of subordinate devices, a user request for personalized content comprising information associated with a partially viewed content on one or more prior flights from a device located on an aircraft during a current flight;
  - identifying the personalized content comprising the information associated with the partially viewed content for responding to the user request;
  - determining that access of the partially viewed content by the second device is subject to control by the content access control instruction; and
  - responsive to determining that the personalized content is accessible by the second device based on the content access control instruction, providing the personalized content for responding to the user request, wherein providing comprises resuming in the current flight the partially viewed content for user consumption from a point of termination in the one or more prior flights.

8. The system of claim 7, further storing instructions for:
- aggregating, via the one or more hardware processors, information on user preferences for the personalized content from at least one of: a mobile device, a display device located in the aircraft, or an airline passenger account; and
- providing, via the one or more hardware processors, the aggregated user preferences to the off-aircraft airline server via the network connection.

9. The system of claim 7, wherein the personalized content for responding to the user request is identified using at least one of: a phase of a journey of the aircraft, one or more user content playlists, or one or more user content preferences.

10. The system of claim 7, wherein the personalized content is identified using information on a geographic extent of content rights associated with the personalized content.

11. The system of claim 7,
- wherein the in-flight entertainment server is operatively connectable to a display device affixed in the aircraft during flight; and
- wherein the personalized content is provided to the display device for responding to the user request from the device located on the aircraft during flight.

12. The system of claim 7, wherein the device located on the aircraft during flight is one of: a passenger mobile device or a display device affixed in the aircraft during flight.

* * * * *